(12) United States Patent
Amano et al.

(10) Patent No.: US 10,067,321 B2
(45) Date of Patent: Sep. 4, 2018

(54) OPTICAL SYSTEM AND IMAGING SYSTEM

(71) Applicants: Seiya Amano, Kawasaki (JP); Hiroyuki Satoh, Yokohama (JP)

(72) Inventors: Seiya Amano, Kawasaki (JP); Hiroyuki Satoh, Yokohama (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/068,392

(22) Filed: Mar. 11, 2016

(65) Prior Publication Data

US 2016/0266359 A1   Sep. 15, 2016

(30) Foreign Application Priority Data

Mar. 13, 2015 (JP) ................................. 2015-051247

(51) Int. Cl.
  *G06K 7/10*  (2006.01)
  *G02B 13/06* (2006.01)
  *G02B 5/20*  (2006.01)
  *G02B 27/00* (2006.01)

(52) U.S. Cl.
  CPC ............. *G02B 13/06* (2013.01); *G02B 5/208* (2013.01); *G02B 27/0018* (2013.01)

(58) Field of Classification Search
  CPC ........ G02B 5/208; G02B 5/0891; G02B 5/09; G02B 1/04; G02B 26/0833; G02B 5/223; G02B 5/0284; G02B 13/0045; G02B 13/143; G02B 19/0023; G02B 19/0042; G02B 19/0095; G02B 1/10; G02B 1/11; G02B 1/115; G02B 1/118; G02B 27/0006
  See application file for complete search history.

(56) References Cited

U.S. PATENT DOCUMENTS

| 5,724,193 | A  | * | 3/1998  | Hirakawa ........... G02B 15/177 |
|           |    |   |         | 359/691 |
| 9,013,544 | B2 |   | 4/2015  | Satoh et al. |
| 9,019,342 | B2 |   | 4/2015  | Satoh et al. |
| 9,110,273 | B2 |   | 8/2015  | Masuda et al. |
| 9,185,279 | B2 |   | 11/2015 | Masuda et al. |
| 9,201,222 | B2 |   | 12/2015 | Masuda et al. |

(Continued)

FOREIGN PATENT DOCUMENTS

JP   7-234361   9/1995
JP   2001-124990  11/2001
(Continued)

OTHER PUBLICATIONS

JP 2013160984 A English machine translation.*
(Continued)

*Primary Examiner* — Thomas K Pham
*Assistant Examiner* — Sharrief Broome
(74) *Attorney, Agent, or Firm* — Oblon, McClelland, Maier & Neustadt, L.L.P.

(57) ABSTRACT

An optical system, which may include a fish-eye lens including a whole view angle larger than 180 degrees, includes in order from an object-side to an imaging-side, a first lens group including a negative focal distance, an aperture, and a second lens group including a positive focal distance. An infrared cutting coat is coated on a lens surface that includes curvature of a lens among lenses included in the second lens group.

16 Claims, 2 Drawing Sheets

(56) References Cited

U.S. PATENT DOCUMENTS

| | | | |
|---|---|---|---|
| 9,261,679 B2 | 2/2016 | Masuda et al. | |
| 2007/0177280 A1* | 8/2007 | Hirayama | G02B 5/282 |
| | | | 359/722 |
| 2009/0141368 A1* | 6/2009 | Iyama | G02B 13/18 |
| | | | 359/717 |
| 2013/0063754 A1 | 3/2013 | Saisho et al. | |
| 2013/0100546 A1 | 4/2013 | Okano | |
| 2014/0071226 A1 | 3/2014 | Satoh et al. | |
| 2015/0192762 A1 | 7/2015 | Satoh et al. | |
| 2015/0301316 A1 | 10/2015 | Masuda et al. | |

FOREIGN PATENT DOCUMENTS

| | | |
|---|---|---|
| JP | 2002-277738 | 9/2002 |
| JP | 3743584 | 11/2005 |
| JP | 2005-345806 | 12/2005 |
| JP | 2013-160984 | 8/2013 |
| JP | 2013160984 A * | 8/2013 |
| JP | 2016-009152 | 1/2016 |

OTHER PUBLICATIONS

Japanese 1st OA dated Jul. 7, 2015, in JP Patent Application No. 2015-051247 (with English translation).
Japanese 1st Final OA dated Nov. 4, 2015, in JP Patent Application No. 2015-051247 (with English translation).

* cited by examiner

OPTICAL SYSTEM AND IMAGING SYSTEM

CROSS-REFERENCE TO RELATED APPLICATIONS

The present application claims priority under 35 U.S.C. § 119 to Japanese Patent Application No. 2015-051247, filed Mar. 13, 2015, the entire contents of which are incorporated herein by reference.

BACKGROUND OF THE DISCLOSURE

I. Field

The present disclosure relates to an optical system and an imaging system.

II. Description of the Related Art

There is a need for optical elements which cut Infrared (hereinafter referred to as 'IR') in optical systems for imaging apparatuses such as general cameras. This is because IR included in components of sun light and so on affects an influence of image deterioration and so on to a captured image. For this reason, generally, an IR cut filter (hereinafter referred to as 'IRCF') is disposed in front of the image so that transmission of IR is inhibited.

Though it is possible to cut infrared by the IRCF such as described above, an occurrence of a ghost becomes a problem due to the IRCF. Also, as an IR cut coat (hereinafter referred to as 'IRCC') which cuts IR, there is a method for coating the IRCC to a lens surface of a lens between a foreground of an optical system and an image surface of an image sensor. But, there is a problem that a reflection property of the coat is changed by unevenness at a central part and a surrounding part of the lens surface in the case of coating the IRCC on a lens surface having curvature.

For reducing the occurrence of the ghost, a technology that the IRCC is coated on a side of an emission surface of a prism has been known. This technology has a good IR cut function and attempts to inhibit the occurrence of the ghost due to the IR cut structure. (Refer to Japanese Patent Application Unexamined Patent Application Publication No. 2006-017837). However, the technology discloses that the IRCC is coated on the prism surface which is on special optical elements. Therefore, there is a problem to attempt to fully inhibit the occurrence of the ghost.

SUMMARY

The present disclosure is advanced in consideration of solving the above problems. A purpose is to thus provide an optical system and an imaging system that inhibit an influence of a change in a coat reflection property due to a coat unevenness of the IRCC on a lens surface having curvature.

To solve the above problems and achieve the purpose, the present disclosure provides an optical system including a fish-eye lens including a whole view angle larger than 180 degrees, and including in order from an object-side to an imaging-side, a first lens group including a negative focal distance, an aperture, and a second lens group including a positive focal distance. An infrared cutting coat is coated on a lens surface that includes curvature of a lens among lenses included in the second lens group.

BRIEF DESCRIPTION OF THE DRAWINGS

The accompanying drawings are included to provide further understanding of the present disclosure, and are incorporated in and constitute a part of this specification. The drawings illustrate embodiments of the disclosure and, together with the specification, serve to explain the principles of this application.

DETAILED DESCRIPTION OF THE ILLUSTRATIVE EMBODIMENTS

Embodiments of an optical system and an imaging system of the present disclosure are described below and by referring to the figures. Also, the present disclosure is not limited by the embodiments below, and structure components of the embodiments below include what a skilled person would conceive of what is practically the same, as well as a so-called range of equivalents. Further, without departing from the scope of the embodiments described below, a kind of abridgement, replacement, and change of the structure components can be conducted.

The present disclosure can lead to inhibit an influence of a change in a coat reflection property due to a coat unevenness of the IRCC on a lens surface having curvature.

(A General Arrangement of an Imaging System)

Figure 1:
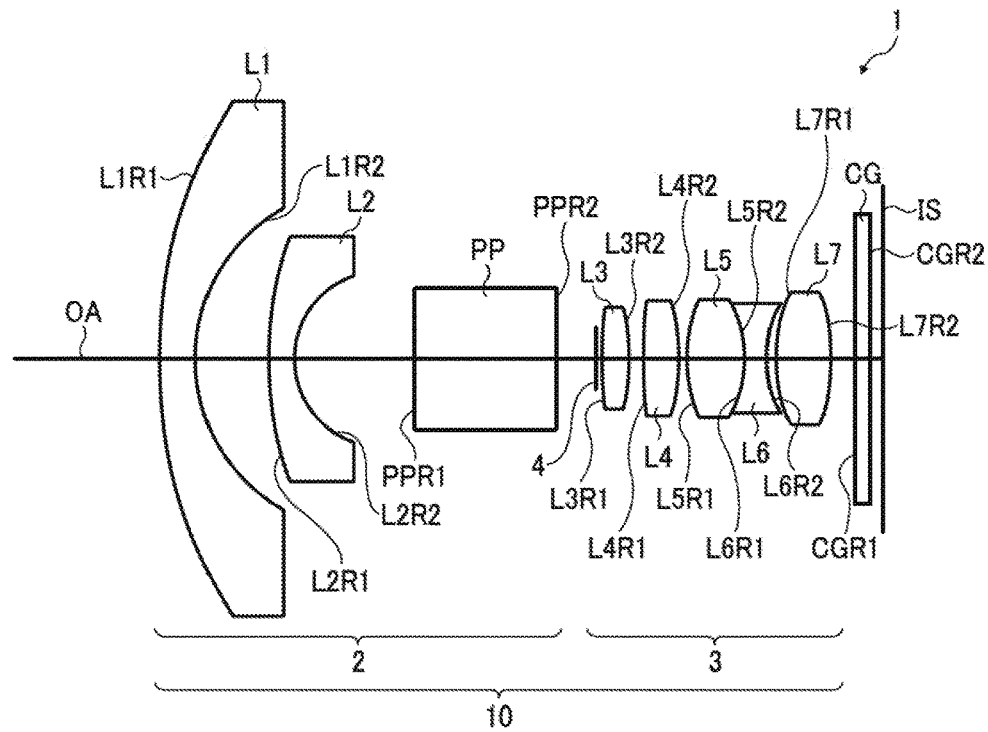
FIG. 1 is a general arrangement of an imaging system according to an embodiment of the present disclosure.

FIG. 1 is a general arrangement of an imaging system 1 which is an illustrative embodiment. By referring FIG. 1, the overall structure of the imaging system 1 is described according to the embodiment.

The imaging system 1 according to the embodiment includes an optical system 10, a cover glass CG, and an image sensor IS (imaging element) such as illustrated by FIG. 1. The optical system 10 is a wide-lens which is called a fish-eye lens. The optical system 10 corresponds to a view angle larger than 180 degrees and selects an equidistant projection. The equidistant projection is a method having a relation $y=f \cdot \theta$ in the case of an image height (a height of an image inside a captured image that is captured by the image sensor IS) as $y$, a focal distance of the optical system 10 as f, and a half view angle as $\theta$. The optical system 10 is made of a front group 2 (a first lens group), an aperture 4, and a back group 3 (a second lens group). The imaging system 1 includes the front group 2, the aperture 4, the back group 3, the cover glass CG, and the image sensor IS, in an order from an object-side to an imaging-side, side by side in series.

The front group 2 is a lens group which is disposed at the object-side of the optical system 10. The front group 2 includes a totally negative refractive power, a negative focal distance, and a function which takes a ray of light of a view angle larger than 180 degrees. The front group 2 includes a lens L1, a lens L2, and a plane parallel plate PP, in an order from the object-side to the imaging-side, side by side in series.

The aperture 4 is an opening aperture which freely adjusts an amount of incident light to the front group 2. The aperture 4 is disposed adjacent to an object-side-surface (a surface L3R1) of a lens L3 which is described later.

The back group 3 is a lens group which is disposed at the imaging-side of the optical system 10. The back group 3 includes a totally positive refractive power, a positive focal distance, and a function which corrects aberration of mainly the captured image. The back group 3 is made of a lens L3, a lens L4, a lens L5, a lens L6, and a lens L7, in an order from the object-side to the imaging-side, side by side in series.

The cover glass CG is a cover element protecting the image IS sensor which is disposed at the imaging-side. The image sensor IS is a solid state image sensor which generates images by converting incident light into the optical system 10 to an electronic signal and capturing objects. The image sensor IS is realized by, for example, a CCD (Charge-Coupled Device) sensor or a CMOS (Complementary Metal Oxide Semiconductor) sensor, and so on.

One example of a structure overview of the structure of each optical element which is described above is illustrated by the Table 1 below.

TABLE 1

| | Lenses | | | | | | | | |
|---|---|---|---|---|---|---|---|---|---|
| | L1 | L2 | plane parallel plate | L3 | L4 | L5 | L6 | L7 | CG |
| Material | glass | glass | glass | glass | glass | glass | glass | glass | glass |
| Shape | spherical meniscus | aspherical meniscus | — | spherical biconvex | aspherical biconvex | spherical biconvex | spherical biconcave | aspherical biconvex | — |
| Coat | AR  AR | WAR  WAR | AR  AR | IRCC  AR | AR  AR | AR  — | —  AR | AR  AR | AR |

As illustrated in the Table 1, the lens L1 is a spherical meniscus lens on both sides of the lens L1, which is made of glass material. The lens L2 is an aspherical meniscus lens on both sides of the lens L2, which is made of glass material. The plane parallel plate PP has optical elements including a vertical and parallel plane to an optical axis and a refractive index of glass material.

The lens L3 is a spherical biconvex lens on both sides of the lens L3, which is made of glass material. The lens IA is an aspherical biconvex lens on both sides of the lens L4, which is made of glass material. The lens L5 is a spherical biconvex lens on both sides of the lens L5, which is made of glass material. The lens L6 is a spherical biconcave lens on both sides of the lens L6, which is made of glass material. The lens L5 and the lens L6 form a cemented lens pasted together at surfaces (i.e. pasted between surface L5R2 and surface L6R1, which are describe later). The lens L7 is an aspherical biconvex lens on both sides of the lens L7, which is made of glass material.

The lenses L1. L2, the plane parallel plate PP, and the lenses L3 to L7, which are describe above and illustrated by FIG. 1, are disposed on an optical axis OA corresponding to each optical axis, side by side in series. The lens surfaces of the lenses L1 to L7 on the object-side, such as illustrated by FIG. 1, are surfaces L1R1, L2R1, L3R1, L4R1, L5R1, L6R1, and L7R1, respectively. Also, the lens surfaces of the lenses L1 to L7 on the imaging-side, such as illustrated by FIG. 1, are surfaces L1R2, L2R2, L3R2, L4R2, L5R2, L6R2, and L7R2, respectively.

The surface of the plane parallel plate PP and the surface of the cover glass CG on the object-side, such as illustrated by FIG. 1, are a surface PPR1 and a surface CGR1, respectively. Also, the surface of the plane parallel plate PP and the surface of the cover glass CG on the imaging-side, such as illustrated by FIG. 1, are a surface PPR2 and a surface CGR2, respectively.

As illustrated by Table 1, an AR (Anti Reflective) coat is applied on the surfaces of L1R1, L2R1, PPR1, PPR2, L3R1, L3R2, L4R1, L4R2, L5R1, L6R2, L7R1, and L7R2. Here, the AR coat is a general low reflection coat.

A WAR (Wide Anti Reflective) coat is applied on the surface L1R2 and L2R2. Here, the WAR coat is a low reflection coat which can inhibit reflectance at a wider wavelength region than the general AR coat.

According to an embodiment, in the optical system 10, the IRCC for cutting IR is coated on the surface L3R1. A function of the IRCC coated on the surface L3R1 is described later.

Next, one example of design data (lens data) about each optical element described above is illustrated in Table 2 below.

TABLE 2

| Surface number | Type | Curvature radius | Thickness | Refractive index | Abbe number |
|---|---|---|---|---|---|
| 1 | spherical | 17.08 | 1.2 | 1.882997 | 40.76511 |
| 2 | spherical | 6.19 | 2.7 | | |
| 3 | aspherical | 26.3 | 0.8 | 1.882023 | 37.2213 |
| 4 | aspherical | 3.26 | 4.23 | | |
| 5 | — | Infinity | 5 | 1.834 | 37.16049 |
| 6 | — | Infinity | 1.54 | | |
| Aperture | — | Infinity | 0 | | |
| 8 | spherical | 12.2 | 1 | 1.84666 | 23.77794 |
| 9 | spherical | −21.46 | 0.51 | | |
| 10 | aspherical | 9.85 | 1.23 | 1.6935 | 53.20078 |
| 11 | aspherical | −11.58 | 0.35 | | |
| 12 | spherical | 6.57 | 2 | 1.744002 | 44.71997 |
| 13 | spherical | −3.64 | 0.74 | 1.945945 | 17.98425 |
| 14 | spherical | 3.69 | 0.36 | | |
| 15 | aspherical | 4.43 | 1.87 | 1.58913 | 61.25089 |
| 16 | aspherical | −7.46 | 0.9 | | |
| 17 | — | Infinity | 0.5 | 1.51633 | 64.14202 |
| 18 | — | Infinity | 0.5 | | |

The surface numbers '1' to '6' and '8' to '18' in Table 2 respectively correspond to surfaces L1R1, L1R2, L2R1, L2R2, PPR1, PPR2, L3R1, L3R2, L4R1, L4R2, L5R1, L6R1-L5R2, L6R2, L7R1, L7R2, CGR1, and CGR2, which are illustrated by FIG. 1. The curvature radius corresponding to a type of 'aspherical' lens illustrates a paraxial curvature radius. Also, the refractive index illustrates a refractive index taken at the sodium D line. In Table 2, units having a length dimension are in [mm].

(IRCC Function of the Present Embodiment)

Figure 2:
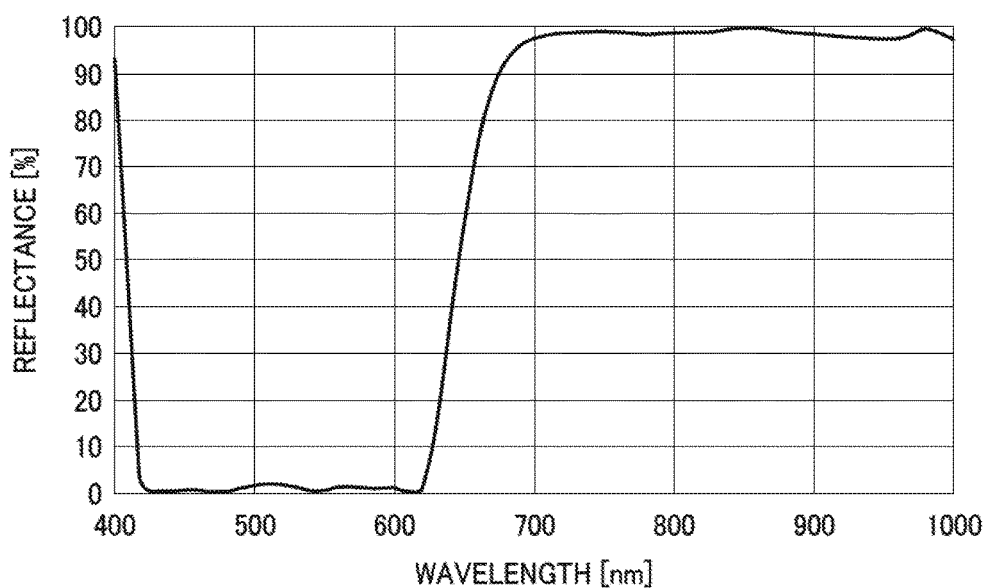
FIG. 2 is a property graph of an IRCC which an example is illustrated according to an embodiment of the present disclosure.
Figure 3:
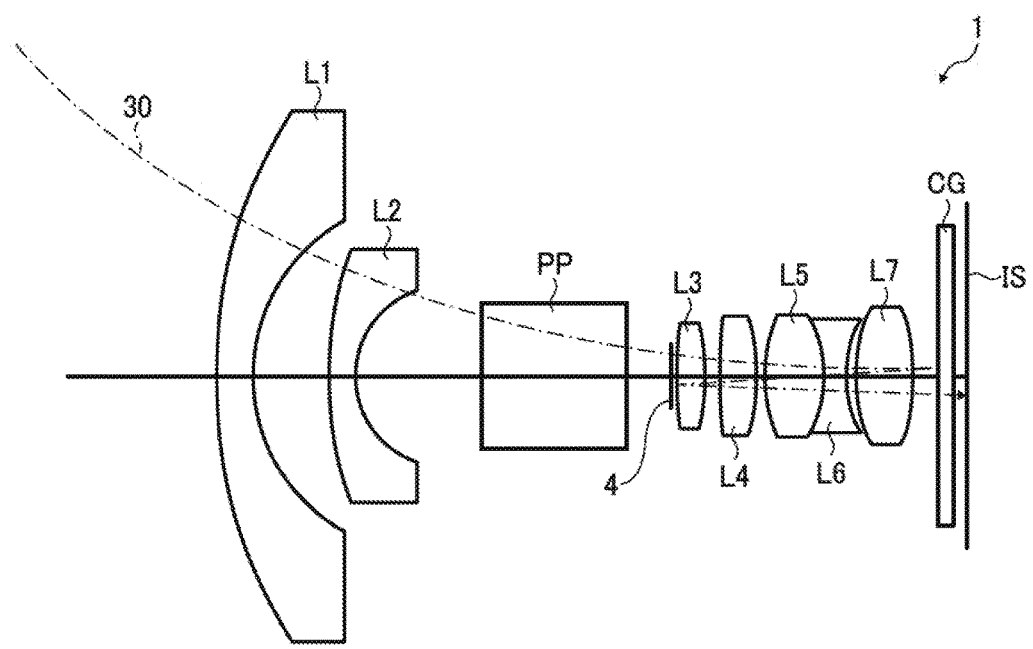
FIG. 3 is a figure which schematically describes a principle of a ghost occurring according to an embodiment of the present disclosure.

FIG. 2 is a property graph of the IRCC of which an example is illustrated. FIG. 3 is a figure which schematically describes a principle of the ghost occurring. While referring to FIGS. 2 and 3, a function of the IRCC coated on the surface L3R1 is described.

The property of reflectance of the IRCC is illustrated in FIG. 2. As illustrated by FIG. 2, IR is cut by enhancing the reflectance of the IRCC with respect to light of a wavelength that is about 650 [nm]. Light of a wavelength near a half value with respect to the reflectance of the IRCC is the light of the wavelength that is about 650 [nm]. Neither transmittance nor reflectance of the light of the wavelength that is about 650 [nm] is a noticeable value. This is why there is a high possibility that IR transmitted through the IRCF reflects by optical elements on the imaging-side, and the reflected light reflects by the IRCF. Thus, there is a high possibility that the ghost occurs. The ghost may occur in the case of a general optical system. In particular, there is a high possibility that the ghost occurs in the case of using the wide-lens called the fish-eye lens, which includes a view angle larger than 180 degrees. This is why incident sun light inside a view angle in the wide-lens often occurs. Therefore, the occurrence of the ghost especially becomes noticeable. Here, the ghost is a phenomenon which occurs in an image on a pixel of an image sensor to which light should not converge. This occurs in the case that a ray of light of high strength, such as sun light and so on, is incident to the optical system, and repeatedly reflects between lens surfaces of the lenses of the optical system.

For inhibiting the occurrence of the ghost such as described above, according to an embodiment of the optical system 10, the IRCC is coated on the surface L3R1 by vapor deposition. Here, while referring to FIG. 3, the principal occurring ghost is described in a simplified manner. As illustrated by FIG. 3, a ray of light 30 incident to the optical system 10 of the imaging system 1 passes the front group 2 and the aperture 4, a part (mainly light of the visible light region) passes by the IRCC coated on the surface L3R1 of the lens L3, and reaches the cover glass CG. There is a part of light that transmits through the cover glass CG and reaches the image sensor IS of the light that reaches the cover glass CG. Pixels which image this light reaching the image sensor IS are the pixels of the image sensor IS to which the ray of light 30 should originally converge. But, a part of the light reaching the cover glass CG is reflected by the surface (surface CGR1) of the cover glass CG on the object-side, faces toward the object-side, and reaches the surface L3R1 again. And, a part of the light reaching the surface L3R1 is reflected again, faces toward the imaging-side, and reaches the image sensor IS. At this time, the pixels which image this light reaching the image sensor IS are different pixels from those to which the ray of light 30 should originally converge. Thus, the ghost occurs. In the above example, an example of the reflected light on the cover glass CG has been described, but reflected light on the other optical system elements (each lens and plane parallel plate PP) included in the optical system 10 may also occur.

Generally, a filter having an IR cut function (IRCF) or the IR coat (IRCC) is often disposed adjacent to the image sensor. But, by disposing the IRCF or the IRCC of high reflectance at a position adjacent to the image sensor, an occurrence of a high strength ghost is very probable. Therefore, it is not better to dispose the IRCF and the IRCC adjacent to the image sensor IS of the imaging system 1.

Further, as a disposed position of the IRCF and the IRCC which can most inhibit the occurrence of the ghost, a foreground of the optical system (the surface L1R1 in the optical system 10 illustrated in FIG. 1) is considered. But, in the case of arranging the IRCF or the IRCC at the foreground of the optical system, there is a problem which is possible that a good IR cut function is lost due to a big change in a property of the IR cut by the total optical system, an adhesion of dirt, and so on. Therefore, arranging the IRCF and the IRCC at the surface L1R which is the foreground of the optical system 10 is also not good.

Therefore, the optical system 10 of the present embodiment includes, as described above, coating the IRCC on the surface L3R1 by vapor deposition. Strength examples of the ghost by forming the IRCC on the surface L3R1 are illustrated below in Table 3. With respect to incident angles of 10, 30, 60, and 80 [degrees] at the optical system 10, a maximum strength of the occurring ghost in the case of an incident ray of light is illustrated in the Table 3. In detail, the Table 3 illustrates the maximum value of the strength of the ghost contributed by the ray of light from a surface B in the case that the incident ray of light into the optical system 10 reflects at a surface A, and the reflected light is reflected further at the surface B. The bigger the value is the stronger the ghost that occurs on the captured image of the image sensor. As illustrated by Table 3, light reflected at the surface L3R1 and the light respectively reflected again at the surfaces LR1, L1R2, L2R, and L2R2, 'plane parallel plate R1' (i.e. the surface PPR1), and 'plane parallel plate R2' (i.e. the surface PPR2) do not include a bad ghost strength reaching the image sensor IS.

TABLE 3

| Surface A | Surface B | the maximum ghost strength: incident angle (10, 30, 60, 80) |
|---|---|---|
| L3R1 | L1R1 | Not bad ghost strength reaching the image sensor |
| L3R1 | L1R2 | Not bad ghost strength reaching the image sensor |
| L3R1 | L2R1 | Not bad ghost strength reaching the image sensor |
| L3R1 | L2R2 | Not bad ghost strength reaching the image sensor |
| L3R1 | plane parallel plate R1 | Not bad ghost strength reaching the image sensor |
| L3R1 | plane parallel plate R2 | Not bad ghost strength reaching the image sensor |
| L3R2 | L3R1 | 7.4131E−08 |
| L4R1 | L3R1 | 1.44544E−07 |
| L4R2 | L3R1 | 9.54993E−08 |
| L5R1 | L3R1 | 8.31764E−08 |
| L6R1 | L3R1 | 3.98107E−05 |
| L6R2 | L3R1 | 1.12202E−07 |
| L7R1 | L3R1 | 9.12011E−08 |
| L7R2 | L3R1 | 1.44544E−07 |
| CGR1 | L3R1 | 3.01995E−06 |
| CGR2 | L3R1 | 2.81838E−06 |
| IS | L3R1 | 1.7378E−06 |

As illustrated by the above Table 3, in the optical system 10 of the present embodiment, by coating the IRCC on the surface L3R1, the occurrence of the ghost is inhibited. In particular, in the optical system 10 that includes a fish-eye lens having a view angle larger than 180 degrees, the ghost inhibition effect is noticeable.

The IRCC coated on the surface L3R1 is disposed adjacent to and behind the aperture 4 (toward the imaging-side). The aperture 4 is disposed such that a principal ray on the optical axis OA (hereinafter referred to as 'on the axis') and a principal ray out of the optical axis OA (hereinafter referred to as 'out of the axis') are crossed at a center of this opening aperture. Therefore, the light passing the aperture 4 becomes a converged light flux by coating the IRCC on the surface L3R1, and spreading of the ray of light passing the IRCC can be inhibited. Thus, an influence of a change in a coat reflection property can become a minimum even though the IRCC coated on the surface L3R1 has coat unevenness.

Coating the IRCC on the surface L3R1 forms the IRCC (referring to the Table 2) on the lens group of the imaging-side with respect to the aperture 4, in other words, on a surface which includes a largest curvature radius of the lens surfaces of the lenses included in the back group 3. Generally, in the case that the IRCC is coated on a lens surface having curvature, there is coat unevenness between a central part and a surrounding part of the lens surface, and a coat reflection property changes. In particular, the smaller the curvature radius becomes, the larger the curvature becomes. A large variation of the coat reflection property between the central part and the surrounding part of the lens surface on which the IRCC is coated on is very probable. Changing the coat reflection property, for example, by shifting a wavelength for which reflectance rises is given. But, in the optical system 10 of the present embodiment, variation of the coat reflection property of the IRCC can be inhibited to a minimum because the IRCC is formed on the surface with the largest curvature radius of the lens surfaces of the lenses included in the back group 3.

Further, coating the IRCC on the surface L3R1 forms the IRCC on a surface of spherical convex shape (referring to the Table 1 and the Table 2). For example, in the case of forming the IRCC on an aspherical lens surface by vapor deposition and so on, due to the aspherical surface, coat unevenness of the IRCC coated is invited, and changing the coat reflection property is very probable, as well as what is described above. But, in the optical system 10 of the present embodiment, because the IRCC is formed on the surface of the spherical convex shape, coat unevenness of the IRCC can be inhibited.

As discussed above, it is possible by coating the IRCC on the surface L3R1 to inhibit the influence of the change in the coat reflection property due to coat unevenness of the IRCC on a lens surface having curvature.

Further, according to an embodiment, the optical system 10 includes a fish-eye lens, but this is not limiting. In another example, by applying the structures which are described above to an optical system that does not include a fish-eye lens, the advantageous effects which are described above are also acquired.

What is claimed is:

1. An optical system comprising:
    a fish-eye lens including a whole view angle larger than 180 degrees, including:
    in order from an object-side to an imaging-side, a first lens group including a negative focal distance, an aperture, and a second lens group including a positive focal distance and five lenses, wherein
    an infrared cutting coat is coated on a lens surface that includes curvature of a lens among the five lenses included in the second lens group, and the lens among the five lenses is a closest one of the five lenses to the aperture,
    the lens surface on which the infrared cutting coat is coated is the only lens surface among lens surfaces of the five lenses included in the second lens group to include any infrared cutting coat, and
    the lens that includes the lens surface on which the infrared cutting coat is coated includes a largest curvature radius among the five lenses included in the second lens group.
2. The optical system according to claim 1, wherein the lens surface on which the infrared cutting coat is coated is a surface of spherical and convex shape.
3. An imaging system comprising:
    the optical system according to claim 1; and
    an image sensor that generates a captured image by converting light passing through the optical system to an electronic signal.
4. An optical system comprising:
    a fish-eye lens including a whole view angle larger than 180 degrees, including:
    in order from an object-side to an imaging-side, a first lens group, an aperture, and a second lens group including five lenses, wherein
    an infrared cutting coat is coated on a lens surface that includes curvature of a lens among the five lenses included in the second lens group,
    the lens surface on which the infrared cutting coat is coated is a closest lens surface of lens surfaces of the five lenses included in the second lens group to the aperture,
    the lens surface on which the infrared cutting coat is coated is the only lens surface among the lens surfaces of the five lenses included in the second lens group to include any infrared cutting coat, and
    the lens that includes the lens surface on which the infrared cutting coat is coated includes a largest curvature radius among the five lenses included in the second lens group.
5. The optical system according to claim 4, wherein the first lens group includes a negative focal distance, and the second lens group includes a positive focal distance.
6. The optical system according to claim 4, wherein the lens surface on which the infrared cutting coat is coated is a surface of spherical and convex shape.
7. An imaging system comprising:
    the optical system according to claim 4; and
    an image sensor that generates a captured image by converting light passing through the optical system to an electronic signal.
8. An optical system comprising:
    a fish-eye lens including a whole view angle larger than 180 degrees, including:
    in order from an object-side to an imaging-side, a first lens group including a negative focal distance, an aperture, and a second lens group including a positive focal distance and five lenses, wherein
    an infrared cutting coat is coated on a lens surface that includes curvature of a lens among the five lenses included in the second lens group, and the lens among the five lenses is a closest one of the five lenses to the aperture, and
    the lens that includes the lens surface on which the infrared cutting coat is coated includes a largest curvature radius among the five lenses included in the second lens group.
9. The optical system according to claim 8, wherein the lens surface on which the infrared cutting coat is coated is a surface of spherical and convex shape.
10. An imaging system comprising:
    the optical system according to claim 8; and
    an image sensor that generates a captured image by converting light passing through the optical system to an electronic signal.
11. The optical system according to claim 1, wherein the lens that includes the lens surface on which the infrared cutting coat is coated includes an opposing lens surface that is coated with an anti-reflective coat.
12. The optical system according to claim 11, wherein at least one of lenses of the first lens group includes a lens surface that is coated with a wide anti-reflective coat that inhibits reflectance at a wider wavelength region than the anti-reflective coat.
13. The optical system according to claim 4, wherein the lens that includes the lens surface on which the infrared cutting coat is coated includes an opposing lens surface that is coated with an anti-reflective coat.

14. The optical system according to claim 13, wherein at least one of lenses of the first lens group includes a lens surface that is coated with a wide anti-reflective coat that inhibits reflectance at a wider wavelength region than the anti-reflective coat.

15. The optical system according to claim 8, wherein the lens that includes the lens surface on which the infrared cutting coat is coated includes an opposing lens surface that is coated with an anti-reflective coat.

16. The optical system according to claim 15, wherein at least one of lenses of the first lens group includes a lens surface that is coated with a wide anti-reflective coat that inhibits reflectance at a wider wavelength region than the anti-reflective coat.

* * * * *